INVENTORS
VERNON W. WHINERY &
JOHN H. WOLCOTT &
BY JOHN E. TEDSTROM JR.

ATTORNEYS

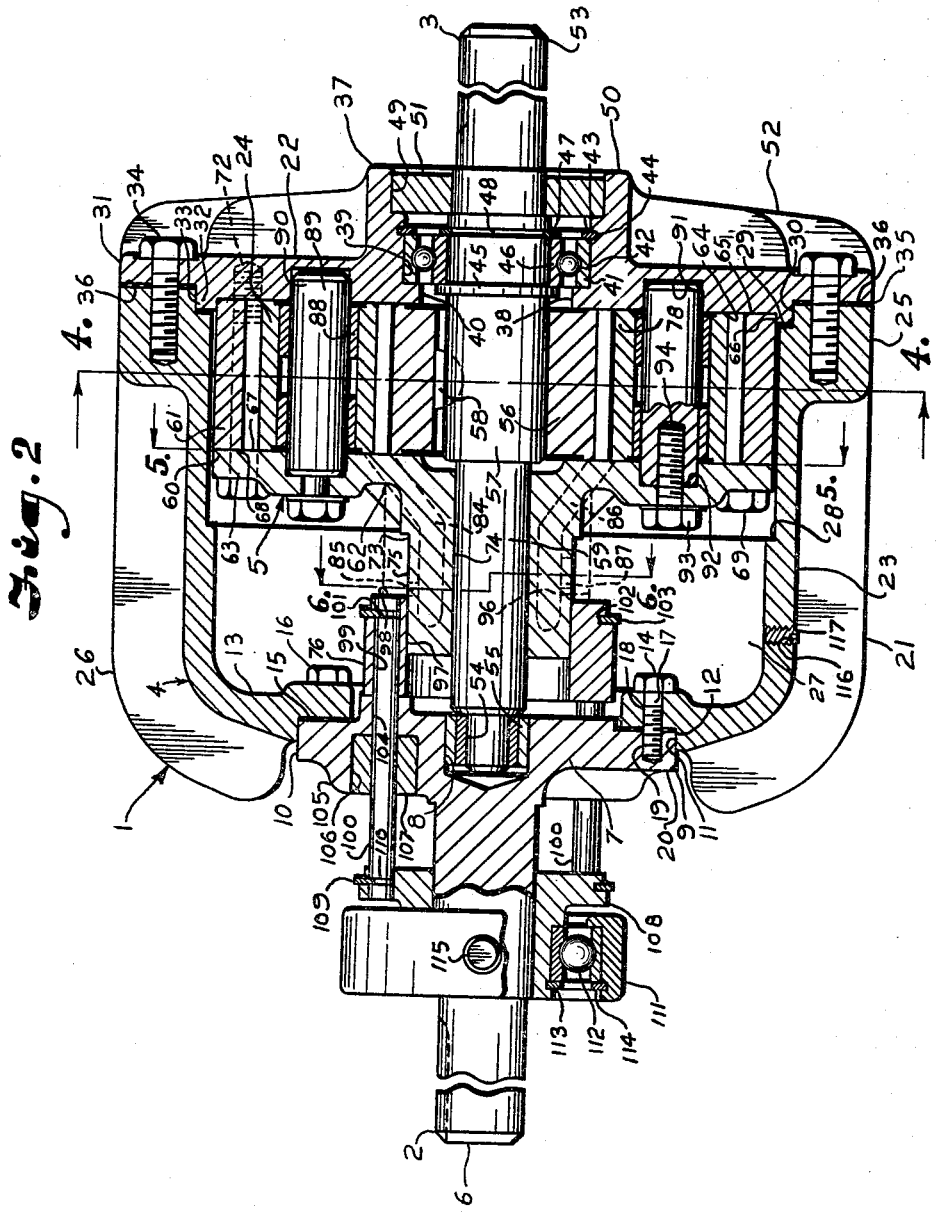

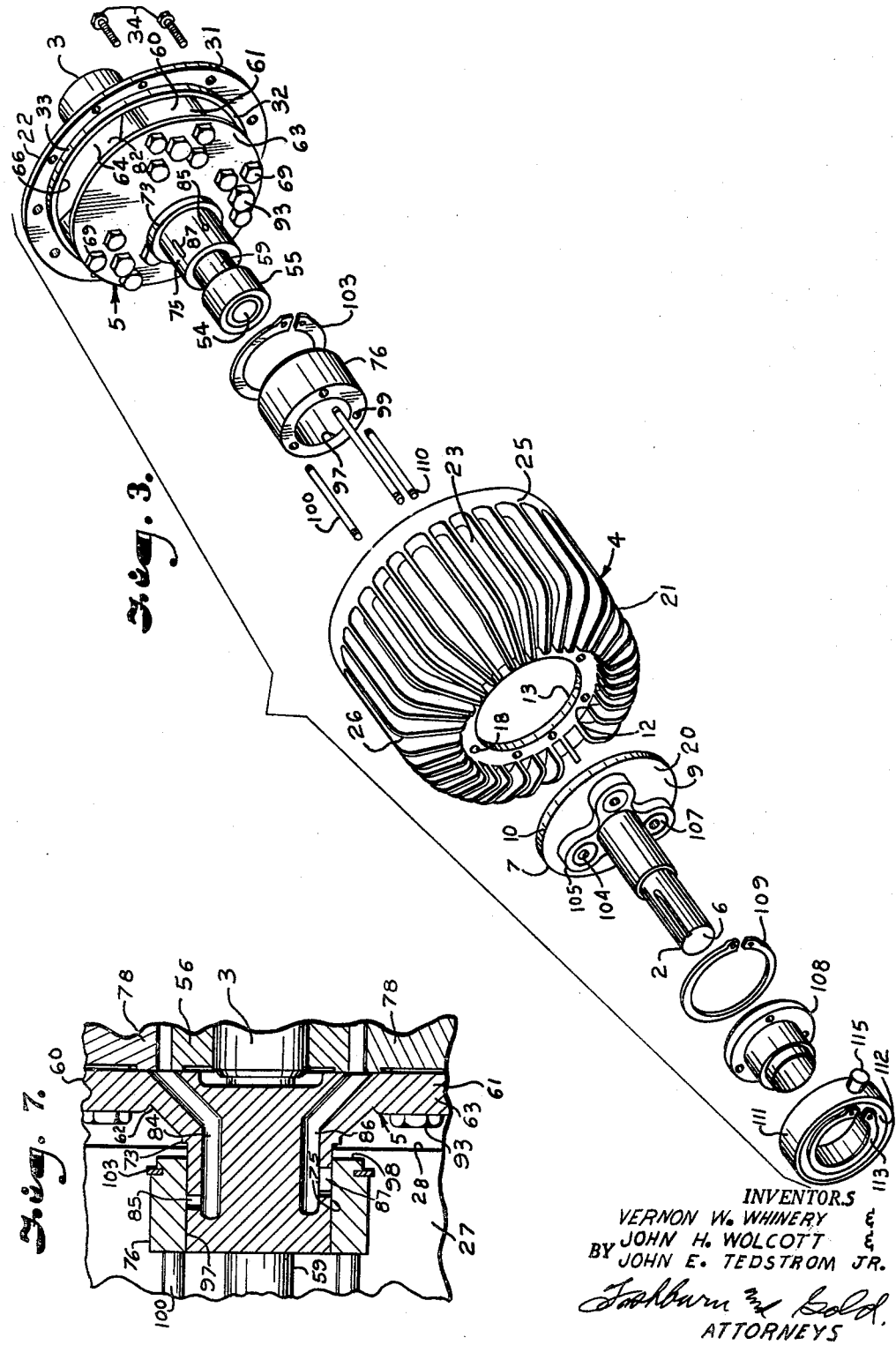

Feb. 26, 1963 V. W. WHINERY ETAL 3,078,976
VARIABLE SPEED HYDRAULIC COUPLING
Filed Aug. 21, 1961 4 Sheets-Sheet 4
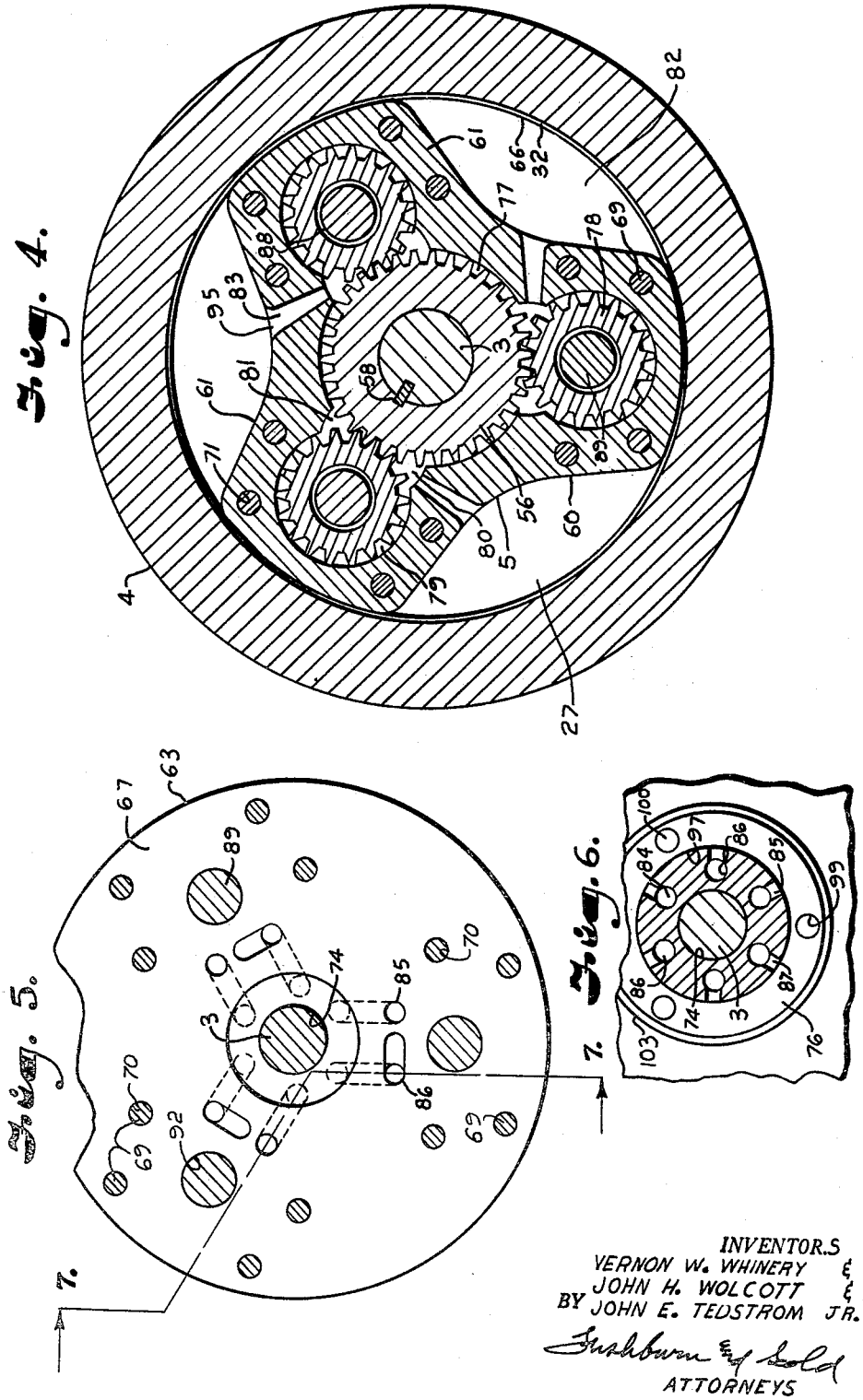
INVENTORS
VERNON W. WHINERY &
JOHN H. WOLCOTT &
BY JOHN E. TEDSTROM JR.
ATTORNEYS

3,078,976
VARIABLE SPEED HYDRAULIC COUPLING
Vernon W. Whinery, John H. Wolcott, and John E. Tedstrom, Jr., Parsons, Kans., assignors, by mesne assignments, to Eaton Manufacturing Company, Cleveland, Ohio, a corporation of Ohio
Filed Aug. 21, 1961, Ser. No. 132,797
5 Claims. (Cl. 192—61)

This invention relates to variable speed hydraulic couplings or clutches, and more particularly to such devices of the type employing a rotatable casing driven by a prime mover and in which casing two fluids of different resistant value are employed and the control of the fluids is through a fluid circulating and power transmitting instrumentality in providing varying speeds to a driven shaft extending into the casing.

According to the embodiment of the present invention disclosed in the attached drawings, the clutch or coupling casing is driven by a drive shaft affixed thereto and a driven shaft extends coaxially into the casing with a sun gear of a planetary gear type pump keyed thereto. The casing carries preferably a plurality of planetary gears meshing with the sun gear which is mounted on the driven shaft. In operation, the casing is partially filled with oil which occupies an annular space near the outer periphery of the casing when the latter is rotated by the driving shaft and, during such operation, the central portion of the space within the casing is occupied by air. In neutral operation, when it is desired that no coupling be established between the driving and driven shafts, only air enters the inlet ports of the pump and with a control valve in open position relative to the pump discharge, the planetary gears, together with the casing, will rotate about the stationary sun gear and will be effective to pump only air which is freely discharged in the central air space within the casing, and no drive from the driving shaft to the driven shaft is transmitted because the movement of air through the pump offers no appreciable resistance. When it is desired to establish a driving connection between the shafts, the control valve is operated to close the air intake ports whereby oil from the annulus of oil within the casing will be drawn into the intake ports and circulated through the pump and discharged through the oil discharge ports. During the rotation of the casing, the suction created by the pump gears will cause flow of oil into the pump and provide resistance, and since the discharge ports are adapted to be restricted by the control valve, considerable resistance to the pumping effort is introduced, and this resistance manifests itself in an attempt of the planetary gears to drag the sun gear around with them, thus imparting an increase speed to the driven shaft. The change or increase in speed may be progressive by progressively restricting the discharge ports. When the discharge ports are completely closed, the inlet ports communicating with the oil annulus being always open, the tendency of the pump gears to draw in oil will cause the pump to be completely filled with oil alone. When the discharge ports are completely closed, the planetary gears will be unable to rotate relative to the sun gear to effect pumping, and the driven and driving shafts will thus be locked together in substantially one to one driving relationship in the desired direction of rotation.

It has been common in variable speed hydraulic couplings or clutches heretofore used to provide the casing in opposed portions with the pump body located therebetween and, due to the relatively high pressures that are developed, even though close tolerances in machining were maintained, leakage could occur. Heat created in the operation could result in distortion of parts whereby such structures required complicated expensive structures and valving operations.

The principal objects of the present invention are to provide a simplified construction of variable speed hydraulic coupling wherein a substantial reduction in cost of manufacture is attained with increased efficiency of operation; to provide such a structure with continually open oil intake ports or openings and a single combined fluid intake and discharge valve for controlling the flow of both air and oil through the pump; to provide such a structure in which rotation induces flow of oil and cooling air to dissipate heat created by the pump; to provide such a structure wherein the pump is assembled on a casing portion and moved as a unit into the other casing portion with all fastening devices for the casing and pump body interiorly of the casing except those required for fastening the two casing portions together; to provide such a structure wherein a casing end plate forms a side member of the pump; to provide such a structure with a simplified fluid control valve and flow passages with a minimum of parts therefor whereby it is more easily produced substantially eliminating possible errors in assembly and improper operation or loss of efficiency that could result therefrom; and to provide such a structure that will serve as an engaging clutch and a speed controlling unit that will smoothly start any load the prime mover can pull when running at its full speed and power and provide shock absorbing protection to all parts of the prime mover and transmission through its flexible hydraulic operation.

Other objects and advantages of this invention will become apparent from the following description taken in connection with the accompanying drawings wherein are set forth by way of illustration and example certain embodiments of this invention.

FIG. 2 is a longitudinal sectional view through the hydraulic coupling.

FIG. 3 is a disassembled perspective view of the parts of the hydraulic coupling.

FIG. 4 is a transverse sectional view through the coupling taken on the line 4—4, FIG. 2.

FIG. 5 is a transverse sectional view through the fluid pump taken on the line 5—5, FIG. 2.

FIG. 6 is a transverse sectional view through the air intake and oil discharge ports taken on the line 6—6, FIG. 2.

FIG. 7 is a fragmentary longitudinal sectional view through the pump and valve with the valve in discharge closing position whereby the pump locks the driving and driven shaft together.

Figure 1:
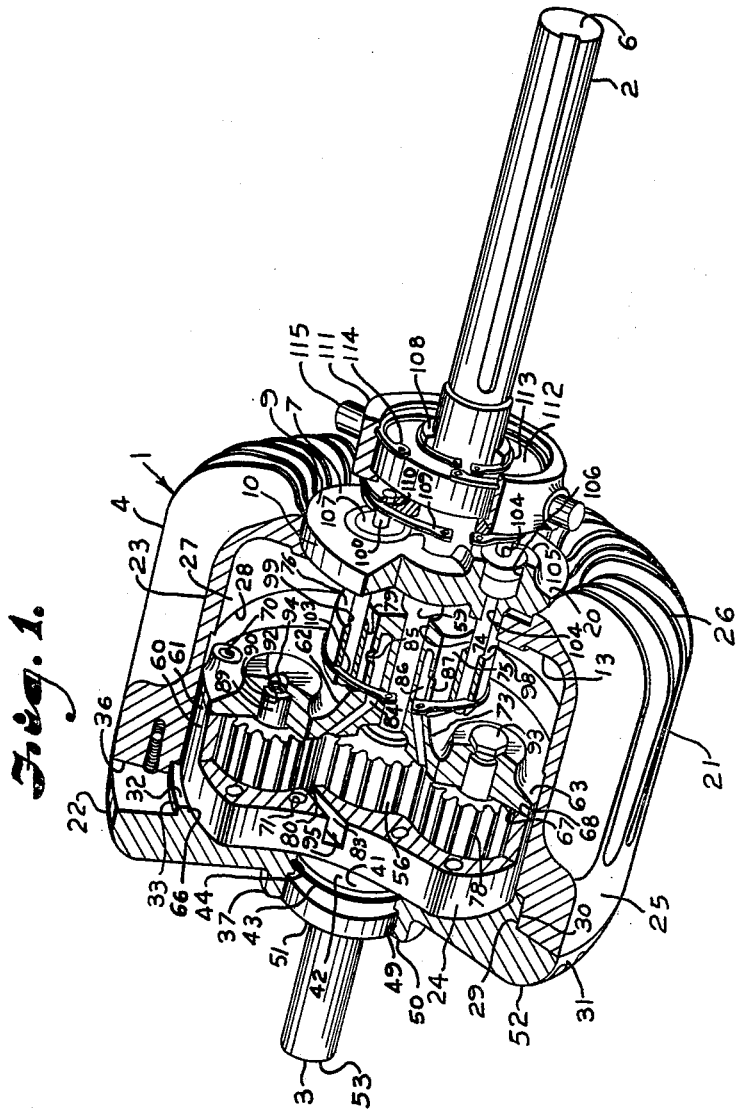
FIG. 1 is a perspective view through a hydraulic coupling embodying the present invention with portions broken away to show the control valve and gearing of the pump.

Referring more in detail to the drawings:

1 generally designates a variable speed hydraulic clutch or coupling operable to effect a drive from a rotary power driven means such as a drive shaft 2 to a driven member or shaft 3 through a casing 4 and a fluid pump 5 located therein. The drive shaft 2 may be driven by any suitable prime mover or may be the armature shaft of an electric motor or the crankshaft of an internal combustion engine. In the structure illustrated, the drive shaft 2 has an end portion 6 adapted to be connected to a suitable prime mover (not shown) and, at the opposite end, said shaft is provided with an enlarged head 7 with a central axial bore 8 extending into said other or inner end. The head 7 has an annular flange 9 with a cylindrical periphery 10, a portion of which periphery engages the surface 11 of a cylindrical recess 12 in an end wall 13 of the casing 4 to center the flange and position the drive shaft 2 coaxial with the casing, the flange 9 being secured to the casing wall 13 by suitable fastening devices such as cap screws 14 with a gasket 15 interposed between the flange and wall to form a fluid-tight seal therebetween. The cap screws 14 have heads 16 positioned in the casing with threaded shanks 17 of the cap screws extending through bores 18 in the casing wall 13 and threaded into threaded sockets 19 in the flange 9, said sockets terminating in spaced relation to the outer surface 20 of the flanges whereby no leakage can occur through said connection.

The casing 4 generally consists of a body section 21 and an end plate member or section 22. The body section includes the end wall 13 with a substantially cylindrical wall 23 extending therefrom oppositely to the drive shaft 2 and terminating in an open end 24. An annular flange 25 is arranged on the wall 23 adjacent the open end 24 for connection of the end plate 22 to close the casing, as later described. The wall 23 and end wall 13 are preferably integral and are provided with outwardly projecting ribs or fins 26 which extend substantially from the recess 12 to the flange 25 and function as strengthening elements and also as cooling fins. The fins 26 are arranged on the end wall 13 and wall 23 whereby rotation of the casing causes air to flow outwardly along the end wall 13 and then along the surface of the casing between the fins toward the flange 25 to cool the casing. The casing, including the portion 21 and the end plate 22, cooperates with the head 7 in defining a chamber 27 therein and, in the structure illustrated, the inner surface of the wall 23 is machined from adjacent the open end 24 to a point 28 beyond the pump to proivde a pump receiving portion and also has an enlarged counterbore 29 with a cylindrical periphery 30 adjacent said open end, as illustrated in FIG. 2. The end plate 22 has an annular flange portion 31 with an inwardly extending ring portion 32 provided with a cylindrical periphery 33 adapted to engage the surface 30 to center said end plate, the end plate being secured to the casing portion 21 by means of suitable fastening devices 34, such as cap screws with a gasket 35 interposed between the flange 31 and the planar face 36 of the flange portion 25 to form a fluid-tight seal.

The end plate 22 has a central hub portion 37 provided with an axial bore 38 through which the driven shaft 3 extends. The hub has a counterbore 39 forming a shoulder 40 for engaging the outer race 41 of an anti-friction bearing 42 fitted in the counterbore 39, the outer race being retained in said counterbore by means of a suitable fastening device such as a split retainer ring 43 engaged in a groove 44, as illustrated in FIG. 2. The driven shaft 3 has a collar 45 engaged by an inner race 46 of the anti-friction bearing adjacent the shoulder 40 with the other end of the inner race being engaged by a split retainer ring 47 engaged in a groove 48 in the shaft to substantially retain the driven shaft against endwise motion relative to the end plate 22. The end plate hub 37 is provided with a further counterbore 49 adjacent the outer end 50 of said hub, and a suitable sealing ring assembly 51 is positioned in said counterbore and engaging the hub and the driven shaft 3 to exclude foreign matter from the bearing and to prevent leakage of oil from the interior of the casing. A plurality of outwardly projecting ribs or fins 52 are provided on the end plate 22 and extend from the hub to the periphery of the flange 31 to function as strengthening elements and also as cooling fins.

The driven shaft 3 has an end portion 53 exteriorly of the casing and adapted to be connected with mechanism to be driven. The other end portion of the driven shaft extends axially in the casing and has a reduced end 54 rotatably supported in an anti-friction bearing 55 such as a needle bearing mounted within the central bore 8 in the head 7 of the drive shaft 2. A centrally disposed sun gear 56 is rigidly secured to a large portion 57 of the shaft adjacent the collar 45 as by a key 58 whereby the sun gear is in a position to lie within the axial center of the pump 5, as later described. The portion 59 of the driven shaft between the large portion 57 and the reduced end 54 is cylindrical and is smaller in diameter than the portion 57 and larger than the end 54, as illustrated in FIG. 2.

The pump 5 has a housing 60 which, in the illustrated structure, includes a body 61 with the end plate 22 forming one end of the housing and a manifold member 62 having a plate portion 63 forming the other end of said housing. The ring portion 32 of the end plate 22 defines a recessed inner portion of said plate having a planar face 64 adapted to be engaged by an adjacent face 65 of the body 61 with the body having peripheral portions engaged with the inner surface 66 of the ring 32 to center said body relative to the axis of the casing and the end plate 22, the peripheral portions of the body 61 and manifold member 62 being smaller than the machined cylindrical portion 27 whereby the pump body may be positioned therein with clearance for oil flow therebetween. The plate portion 63 has a cylindrical periphery which is spaced from the portion 27 of the casing to define a narrow passage therebetween through which oil must pass to the pump thereby assuring that the oil pass in contact with the air cooled casing wall. The end plate 63 of the manifold member 62 has a planar surface 67 engaging the adjacent surface 68 of the body 61, said end plate 63, body 61 and end plate 22 being secured together by suitable fastening devices such as cap screws 69 extending through aligned bores 70 and 71 in the end plate 63 and body 61 and threaded into sockets 72 in the end plate 22, said threaded sockets terminating in spaced relation to the outer surface of said end plate whereby there can be no leakage therethrough. The end plate 63 on the manifold member 62 has a hub portion 73 extending therefrom toward the head 7 of the drive shaft, said hub having a bore 74 which receives the portion 59 of the driven shaft with the hub having a peripheral portion 75 machined to form a cylindrical portion on which a valve member 76 is sleeved, as later described.

The pump body 61 is provided with a cavity 77 of a diameter to snugly receive therein the sun gear 56, the cavity 77 having segmental openings opposite planetary gears 78 where same mesh with the sun gear 56. The pump body 61 is also provided with a plurality of cavities 79 for the planetary gears 78 which operatively mesh with the sun gear 56. The pump body cavities 79 for the planetary gears 78 are of a diameter to snugly receive therein the planetary gears 78. The spaces 80 on one side of each of the pump couples comprised by one of the planetary gears 78 and the sun gear 56 constitute inlet chambers for the pump, and the spaces 81 on the opposite sides of each couple constitute outlet or discharge chambers for the pump. The fastening devices or screws 69 and the bores 71 therefor are spaced from the cavities 79 and lie around same, as illustrated in FIG. 4, and the body 61 is cut away in outwardly spaced relation from the bores 71 between the planet gears, as illustrated in FIG. 4, to provide pockets or cavities 82 and, due to the clearance between the periphery of the body and the portion 27 of the casing, oil will pass into the pockets or cavities 82. Each of the inlet chambers 80 is connected by an inlet port or passage 83 opening through the pump body and communicating with the pockets or cavities 82, as illustrated in FIG. 4. The inlet chambers 80 are also connected by passages 84 extending through the manifold member 62 and outwardly in the hub 73 to air inlet ports 85 extending radially through the hub portion to communicate with the chamber 27 of the casing 4, there being a passage 84 and air inlet port 85 for each of the inlet chambers 80. Each of the discharge members 81 is connected by a passage 86 which extends through the manifold member and hub 73 to a discharge port 87, there being a passage 86 and discharge port 87 for each of the discharge chambers 81.

In the structure illustrated, the planetary gears 78 are rotatably mounted by bearings 88 on respective pins 89 which have end portions 90 extending into axially aligned recesses 91 and 92 in the end plate 63 and end plate 22 respectively with said pins secured relative to the end plate 63 by suitable fastening devices 93 such as cap screws which have threaded shanks screwed into threaded sockets 94 in ends of the pins 89 whereby said pins are positively positioned and fixed in place to rotatably mount the planet gears.

When operating, the annulus of oil within the casing is such that the inlet opening 95 of the passages 83 lies in the oil, and the portion of the hub 73 having the ports 85 and 87 therein is of such diameter that said ports open into the zone of air. The inner periphery of the oil annulus is preferably defined by the broken lines 96 in FIG. 2 which is radially outwardly relative to the inlet chambers 80. The fluid intake and discharge control valve 76 consists of a cylindrical hollow body having a bore 97 whereby the valve member is sleeved on and engaged with the portion 75 of the hub 73 of the manifold member 62 and is movable axially thereof, with the end 98 of said valve member adjacent the pump being planar or in a plane transverse to the axis of the hub 73. The valve member has circularly spaced bores 99 spaced outwardly from the bore 97 for receiving shifter rods 100, the end portions of the shifter rods in the valve member having slots 101 registering with a groove 102 in the valve member for receiving a snap ring 103 to retain the shifter rods operatively connected with the valve. The shifter rods extend through bores 104 in the flange 9 of the head 7 of the drive shaft 2, said flange being provided with circularly spaced bosses 105 having counterbores 106 therein for mounting suitable packing 107 to prevent oil leakage from the casing. At their outermost ends, the shifter rods 100 extend into openings in a rotatable shifter sleeve 108 and are held therein by suitable fastening means such as a split ring 109 engaging in transverse grooves 110 near the ends of the shifter rods. The shifter sleeve 108 is mounted on the drive shaft 2 for axial sliding movement therealong. There is no relative rotation between the shifter sleeve 108 and the shaft 2 since the shifter rods 100 rotate with the shaft. A non-rotatable shifter collar 111 is mounted about the shifter sleeve 108 as by means of a ball bearing assembly 112, said collar being held with the bearing against longitudinal movement relative to the shifter ring by means of suitable fastening devices such as split rings 113 and 114. The shifter collar is provided with diametrically opposed studs 115 which are adapted to be continuously engaged within forked ends of a well known valve shifting lever to effect concurrent axial shifting movement of the sleeve 108, rods 100 and valve member 76.

The air inlet ports 85 are substantially smaller or shorter in length longitudinally of the movement of the valve member than the discharge ports 87. Also, the air inlet ports are arranged whereby as the valve member is moved to progressively open the discharge ports 87 the air inlet ports have their ends adjacent the pump substantially in alignment with the ends of the discharge ports remote from the pump whereby the air inlet ports begin to open substantially at the point of movement of the valve member that the discharge ports 87 are substantially fully open. The opening of the air inlet port may be positioned relative to the oil discharge ports whereby the air inlet port will start to open slightly before the oil discharge port is completely opened, if desired.

With a structure constructed as described, the shifter ring 108 and shifter collar 111 are assembled on the drive shaft, the valve 76 is positioned on the shifter rods 100 and the rods inserted through the bores 104, the packing 107 applied, and the rods connected with the shifter ring. Also, the driven shaft 3 is mounted in the bearing 42 and positioned in the end plate 22. The pins 89 are secured to the end plate 63 of the manifold member 62 and then the manifold member, the pump body 61, driven shaft 3 with the sun gear 56 thereon and the planet gears positioned on the pins 89 are all assembled with the end plate 22 and, with the bearing 55 in position in the bore 8, the assemblies on the drive shaft are moved to the casing portion 21 and the head portion of the drive shaft secured to the casing with the gaskets 15 in place by the fastening devices 14 to assure ease of assembly with no leakage around the fastening devices. The assembly on the driven shaft 3 is then moved into the casing, positioning the reduced end 54 in the bearing 55 and with the gasket 35 in place said assembly is secured to the casing portion 21 by means of the fastening devices 34 to assure a fluid-tight seal. A suitable oil fill opening 116 is normally closed by a plug 117 and a suitable quantity of hydraulic fluid such as oil is introduced into the chamber 27 of the casing, and the structure is then ready for operation when connected to a prime mover by the drive shaft 2 and to a member to be driven by the driven shaft 3.

In the operation of a coupling structure assembled as described and connected to a prime mover and member to be driven, and with the valve member 76 in port opening position, as illustrated in FIG. 2, the chamber 27 being partially filled with oil to provide an oil annulus extending radially inwardly to the line 96 as the casing is rotated by the drive shaft 2, the valve being in neutral position, in such neutral operation the oil is prevented from entering the pump intake cavity 80 and the adjacent regions of the gear teeth by centrifugal forces acting upon the oil during the rotation of said casing. The air inlet ports being open, air will be drawn through said ports 85 and passages 84 to the inlet chamber 80 and, air having substantially no resistance, the rotation of the casing and the pump housing therewith will cause the planet gears to planet around the sun gear or roll about the sun gear, functioning to pump only air from the air zone through the pump and through the discharge ports. Such circulation of air alone will not be effective to transmit power to the driven shaft 3 against any appreciable resistance. When it is desired to drive the driven shaft and effect rotation thereof, and with the drive shaft and casing continuing to rotate, the shifter sleeve is moved toward the casing to move the valve member 76 toward the pump, progressively closing the air inlet ports 85, thereby a progressively decreased quantity of air will be caused to enter the pump to supply the volume of displacement and that volume of displacement not filled will result in a progressively increasing quantity of oil entering the pump through the openings 95 and passages 83 until the air inlet ports are closed, and then the discharge ports 87 still being open the full displacement of oil enters unrestricted into the pump cavities and pump gear teeth resulting in transmission of more torque to the driven shaft. The oil passing from the discharge ports has gained considerable heat and, for best results, it should be cooled before reentering the pump. The oil in returning to the pump is forced through the narrow space between the periphery of the plate 63 and the casing wall in a thin layer which is in contact with the casing wall and then enters the cavity 82 and moves to the oil intake ports of the pump. The rotation of the casing causes air to flow thereover between the fins cooling the casing wall and thereby cools the oil in the casing particularly as said oil moves in said thin layer. This assures maximum cooling of the oil and resulting uniform efficiency. As the valve member is further moved toward the pump, it progressively closes the discharge ports 87, restricting said discharge, increasing the resistance to the planet gears rolling about the sun gear, and thereby applying increased torque and/or speed to the driven shaft. When the discharge ports are completely closed, the fluid discharge from the gear pump is arrested, providing a hydrostatic lock in the gear pumps and thereby providing a drive of the driven shaft at substantially the same speed as that of the drive shaft and the casing. The oil inlet ports 95 being fully open at all times, the movement of the valve member from a neutral position to restrict the discharge of oil provides resistance to effect the drive of the driven shaft whereby the speed may be varied from zero to a ratio of one to one, as desired.

It is to be understood that while we have illustrated and described one form of our invention, it is not to be limited to the specific form or arrangement of parts herein described and shown except insofar as such limitations are included in the claims.

What we claim and desire to secure by Letters Patent is:

1. A variable speed hydraulic coupling interposed between rotary power driven means and a driven shaft comprising, a rotatable casing having one end wall with an axial opening therein, said casing having a peripheral wall extending from said end wall and terminating in an open end, an outwardly extending annular flange on said peripheral wall adjacent said open end, a plurality of spaced outwardly extending fins extending radially on said end wall and then longitudinally on said peripheral wall to said annular flange whereby rotation of said casing induces air flow along said walls and fins, a drive shaft operatively connected with the rotary power driven means and having a head adjacent one end, means in the casing and engaging said head to secure the head to the casing end wall in fluid-tight sealed engagement, an end plate secured to the peripheral wall of the casing in fluid-tight engagement to close the open end thereof, said driven shaft being rotatably mounted in said end plate and extending into said casing, a gear pump type transmission mechanism including a body in the casing, a manifold plate, means securing the manifold plate to the end plate with the pump body therebetween whereby said end plate and said manifold plate are sides of said pump mechanism, said manifold plate having a periphery slightly spaced from the peripheral wall of the casing to define a thin oil passage therebetween, said pump having a sun gear fixed to the driven shaft and a plurality of planet gears rotatably mounted in said body in meshing engagement with the sun gear to form pumps, said casing being partially filled with oil whereby during rotation of said casing there is provided an outer annular zone of oil and an inner central zone of air, a plurality of oil inlet passages in said body communicating the inlet chambers with the oil zone and having inlet openings disposed within the zone of oil constantly fully open to the inflow of oil, a plurality of air intake ports in said manifold plate and having communication with the pumps, a plurality of radially disposed fluid discharge ports spaced from the air intake ports and having communication with the pumps, and a valve member movable to selectively open and close the air intake and fluid discharge ports, and means connected to said valve and extending exteriorly of said casing and operable during rotation of said casing for moving said valve and in port closing movement said valve progressively closes the air intake ports and then the fluid discharge ports to arrest the flow of fluid from said discharge ports.

2. A variable speed hydraulic coupling interposed between rotary power driven means and a driven shaft comprising, a rotatable casing having one end wall with an axial opening therein, said casing having a peripheral wall extending from said end wall and terminating in an open end, an outwardly extending annular flange on said peripheral wall adjacent said open end, a plurality of spaced outwardly extending fins extending radially on said end wall and then longitudinally on said peripheral wall to said annular flange whereby rotation of said casing induces air flow along said walls and fins, a drive shaft operatively connected with the rotary power driven means and having a head adjacent one end, means in the casing and engaging said head to secure the head to the casing end wall in fluid-tight sealed engagement, an end plate secured to the peripheral wall of the casing in fluid-tight engagement to close the open end thereof, said driven shaft being rotatably mounted in said end plate and extending into said casing, a gear pump type transmission mechanism including a body in the casing, a manifold plate, means securing the manifold plate to the end plate with the pump body therebetween whereby said end plate and said manifold plate are sides of said pump mechanism, said manifold plate having a periphery slightly spaced from the peripheral wall of the casing to define a thin oil passage therebetween, said pump having a sun gear fixed to the driven shaft and a plurality of planet gears rotatably mounted in said body in meshing engagement with the sun gear, said body having inlet and outlet chambers oppositely disposed relative to the meshing portions of the respective planet and sun gears, said casing being partially filled with oil whereby during rotation of said casing there is provided an outer annular zone of oil and an inner central zone of air with said inlet and outlet chambers radially inwardly of said oil zone, a plurality of oil inlet passages in said body communicating the inlet chambers with the oil zone and having inlet openings disposed within the zone of oil between the manifold plate and said end plate and constantly fully open to the inflow of oil to the inlet chambers of said pump mechanism, a plurality of air intake ports in said manifold plate and having communication with the inlet chambers, a plurality of fluid discharge ports spaced from the air intake ports and having communication with the outlet chambers, a valve member movable to selectively open and close the air intake and fluid discharge ports, and means connected to said valve and extending exteriorly of said casing and operable during rotation of said casing for moving said valve and in port closing movement said valve progressively closes the air intake ports and then the fluid discharge ports to arrest the flow of fluid from said discharge ports.

3. A variable speed hydraulic coupling interposed between rotary power driven means and a driven shaft comprising, a rotatable casing having one end wall with an axial opening therein, said casing having a peripheral wall extending from said end wall and terminating in an open end, a drive shaft operatively connected with the rotary power driven means and having a head adjacent one end, means in the casing and engaging said head to secure the head to the casing end wall in fluid-tight sealed engagement, an end plate secured to the peripheral wall of the casing in fluid-tight engagement to close the open end thereof, said driven shaft being rotatably mounted in said end plate and extending into said casing, a gear pump type transmission mechanism including a body in the casing, a manifold plate, means securing the manifold plate to the end plate with the pump body therebetween whereby said end plate and said manifold plate are sides of said pump mechanism, said pump having a sun gear fixed to the driven shaft and a plurality of planet gears rotatably mounted in said body in meshing engagement with the sun gear, said body having inlet and outlet chambers oppositely disposed relative to the meshing portions of the respective planet and sun gears, said casing being partially filled with out whereby during rotation of said casing there is provided an outer annular zone of oil and an inner central zone of air with said inlet and outlet chambers radially inwardly of said oil zone, a plurality of oil inlet passages in said body communicating the inlet chambers with the oil zone and having inlet openings disposed within the zone of oil constantly fully open to the inflow of oil to the inlet chambers of said pump mechanism, a cylindrical axial extension on said manifold plate and in the air zone, a plurality of radially disposed air intake ports in said extension and having communication therethrough to the inlet chambers, a plurality of radially disposed fluid discharge ports circularly spaced from the air intake ports and having communication through said extension with the outlet chambers, a valve member sleeved on said extension and movable axially thereof to selectively open and close the air intake and fluid discharge ports, said air intake ports and fluid discharge ports each having an edge substantially in a plane transversely of said extension whereby the air intake ports are on one side of and the discharge ports are on the other side of said plane, and means connected to said valve and extending exteriorly of said casing and operable during rotation of said casing for axially moving said valve and in port closing movement said valve progressively closes the air intake ports and then the fluid discharge ports to arrest the flow of fluid from said discharge ports.

4. A variable speed hydraulic coupling as set forth in claim 3 wherein the only openings extending from exteriorly of the casing to the interior thereof are the openings for the driven shaft and the valve moving means, and fluid sealing means in said casing openings engaging the respective driven shaft and the valve moving means in fluid sealing relation.

5. A variable speed hydraulic coupling interposed between rotary power driven means and a driven shaft comprising, a rotatable casing having one end wall with an axial opening therein, said casing having a peripheral wall extending from said end wall and terminating in an open end, an outwardly extending annular flange on said peripheral wall adjacent said open end, said casing having spaced outwardly extending fins extending radially outwardly on said end wall and longitudinally on said peripheral wall to said annular flange whereby air flow is induced along said walls in response to rotation of said casing, a drive shaft operatively connected with the rotary power driven means and having a head adjacent one end, means in the casing and engaging said head to secure the head to the casing end wall in fluid-tight sealed engagement, an end plate secured to the annular flange on the peripheral wall of the casing in fluid-tight engagement to close the open end of the casing, said driven shaft being rotatably mounted in said end plate and extending into said casing, a gear pump type transmission mechanism including a body in the casing, a manifold plate, means securing the manifold plate to the end plate with the pump body therebetween whereby said end plate and said manifold plate are sides of said pump mechanism, said manifold plate having a periphery slightly spaced from the peripheral wall of the casing to define an oil passage therebetween whereby oil will pass in a thin layer in contact with the casing wall, said pump having a sun gear fixed to the driven shaft and a plurality of planet gears rotatably mounted in said body in meshing engagement with the sun gear, said body having inlet and outlet chambers oppositely disposed relative to the meshing portions of the respective planet and sun gears, said casing being partially filled with oil whereby during rotation of said casing there is provided an outer annular zone of oil and an inner central zone of air with said inlet and outlet chambers radially inwardly of said oil zone, a plurality of oil inlet passages in said body communicating the inlet chambers with the oil zone between the body and the casing and having inlet openings disposed within the zone of oil constantly fully open to the inflow of oil to the inlet chambers of said pump mechanism, a cylindrical axial extension on said manifold plate and in the air zone, a plurality of radially disposed air intake ports in said extension and having communication therethrough to the inlet chambers, a plurality of radially disposed fluid discharge ports circularly spaced from the air intake ports and having communication through said extension with the outlet chambers and a valve member sleeved on said extension and movable axially thereof to selectively open and close the air intake and fluid discharge ports.

References Cited in the file of this patent
UNITED STATES PATENTS

| | | |
|---|---|---|
| 1,954,418 | Ley | Apr. 10, 1934 |
| 2,644,561 | Dikeman | July 7, 1953 |
| 2,899,035 | Thomas | Aug. 11, 1959 |